US010594595B2

(12) United States Patent
Boucadair et al.

(10) Patent No.: US 10,594,595 B2
(45) Date of Patent: Mar. 17, 2020

(54) METHOD OF ENSURING CONTINUITY FOR SERVICES SUPPLIED BY A RESIDENTIAL GATEWAY

(71) Applicant: ORANGE, Paris (FR)

(72) Inventors: Mohamed Boucadair, Betton (FR); David Binet, La Chapelle Thouarault (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/770,385

(22) PCT Filed: Oct. 13, 2016

(86) PCT No.: PCT/FR2016/052644
§ 371 (c)(1),
(2) Date: Apr. 23, 2018

(87) PCT Pub. No.: WO2017/068263
PCT Pub. Date: Apr. 27, 2017

(65) Prior Publication Data
US 2018/0316603 A1 Nov. 1, 2018

(30) Foreign Application Priority Data
Oct. 23, 2015 (FR) ..................... 15 60158

(51) Int. Cl.
*H04L 12/707* (2013.01)
*H04L 29/08* (2006.01)
(Continued)

(52) U.S. Cl.
CPC ......... *H04L 45/22* (2013.01); *H04B 7/18504* (2013.01); *H04L 12/2834* (2013.01);
(Continued)

(58) Field of Classification Search
None
See application file for complete search history.

(56) References Cited

U.S. PATENT DOCUMENTS 7,697,930 B2 * 4/2010 Miao ................. H04W 36/0011
370/328
8,817,750 B2 * 8/2014 Choi-Grogan .......... H04W 4/90
370/331
(Continued)

FOREIGN PATENT DOCUMENTS

EP 2273763 A1 1/2011
WO 2010044714 A1 4/2010
WO 2015121563 A1 8/2015

OTHER PUBLICATIONS

Written Opinion of the International Searching Authority dated Jan. 10, 2017 for corresponding International Application No. PCT/FR2016/052644, filed Oct. 13, 2016.
(Continued)

*Primary Examiner* — Anh Vu H Ly
(74) *Attorney, Agent, or Firm* — David D. Brush; Westman, Champlin & Koehler, P.A.

(57) ABSTRACT

A service continuity method includes a step of detecting a fault consisting in at least one service to which a residential gateway normally provides access no longer being accessible or in the quality of service of at least one service to which a residential gateway normally gives access being degraded. The method further includes, after detection: a) a supervision center (CSC) selecting at least one mobile relay; b) the supervision center (CSC) communicating at least one instruction to the selected mobile relay for the purpose of ensuring continuity of the service; c) the mobile relay setting up a session association with the gateway or with an
(Continued)

intermediate device; and d) the traffic relating to the service being redirected to the mobile relay.

12 Claims, 5 Drawing Sheets

(51) Int. Cl.
    *H04L 12/28*     (2006.01)
    *H04L 12/64*     (2006.01)
    *H04W 40/22*     (2009.01)
    *H04B 7/185*     (2006.01)
    *H04L 12/24*     (2006.01)
    *H04L 29/14*     (2006.01)
    *H04L 12/725*     (2013.01)
    *H04L 12/721*     (2013.01)
    *H04L 12/749*     (2013.01)

(52) U.S. Cl.
    CPC ...... *H04L 12/2898* (2013.01); *H04L 12/6418* (2013.01); *H04L 41/5025* (2013.01); *H04L 67/141* (2013.01); *H04L 67/16* (2013.01); *H04L 67/28* (2013.01); *H04W 40/22* (2013.01); *H04L 45/30* (2013.01); *H04L 45/66* (2013.01); *H04L 45/741* (2013.01); *H04L 69/40* (2013.01)

(56) References Cited

U.S. PATENT DOCUMENTS

| | | | |
|---|---|---|---|
| 10,103,932 B2 * | 10/2018 | Baranski | H04W 76/14 370/328 |
| 2008/0076420 A1 * | 3/2008 | Khetawat | H04W 8/04 455/435.1 |
| 2011/0216646 A1 * | 9/2011 | Flinta | H04L 12/5692 370/220 |
| 2016/0226922 A1 * | 8/2016 | Russell | H04L 65/1016 370/328 |
| 2017/0054589 A1 | 2/2017 | Baranski et al. | |
| 2018/0092017 A1 * | 3/2018 | Freda | H04W 76/14 370/328 |
| 2018/0176850 A1 * | 6/2018 | Phan | H04W 88/04 370/328 |
| 2019/0058628 A1 * | 2/2019 | Boucadair | H04L 12/2834 370/328 |

OTHER PUBLICATIONS

International Search Report dated Jan. 10, 2017 for corresponding International Application No. PCT/FR2016/052644, filed Oct. 13, 2016.

* cited by examiner

METHOD OF ENSURING CONTINUITY FOR SERVICES SUPPLIED BY A RESIDENTIAL GATEWAY

CROSS-REFERENCE TO RELATED APPLICATIONS

This application is a Section 371 National Stage Application of International Application No. PCT/FR2016/052644, filed Oct. 13, 2016, the content of which is incorporated herein by reference in its entirety, and published as WO 2017/068263 on Apr. 27, 2017, not in English.

FIELD OF THE DISCLOSURE

The present invention relates to services provided by residential gateways.

More particularly, the invention relates to restoring at least one telecommunications service to which a residential gateway gives access so as to ensure continuity of service in the event of a fault. For reasons of concision, it is said below that a gateway is "faulty" when at least one service to which it gives access under normal circumstances is no longer accessible, or when the quality of at least one service to which it gives access under normal circumstances is degraded.

BACKGROUND OF THE DISCLOSURE

The Internet protocol (IP) network is nowadays the universal medium for a multitude of applications and services such as voice-over-IP (VoIP), or digital television (IPTV). It is the federating network that has been adopted by telecommunications operators for implementing various offers of service. For several years, this democratization of the Internet has made the general public one of the preferred targets of telecommunications operators who are ever more numerous in seeking to position themselves in this market segment. This movement has been accompanied by the development of offers of services that are specifically adapted to this customer base, combining several services, thus making use of the advantages of the IP network. These include so-called "multi-service" offers such as "triple play" offers that give access simultaneously to the Internet, to video contents (including broadcast television programs), and to conversational services (telephony over IP), which have captured an increasing share of the market. These offers are usually presented in the form of package deals, and they attract the general public because of rich functionality that is accessible at a reasonable price. Under such circumstances, telecommunications operators are seeking to distinguish themselves from one another by increasing and diversifying the number of services that are available in their "packages", in order to attract and then retain their customers, in particular general public customers. In this respect, all general public customer profiles constitute potential marketing targets, from young couples to retirees.

One of the factors common to the offers of all of those operators is the installation of a residential gateway, which is also often referred to as a "set top box", or customer premises equipment (CPE), or a home gateway (HG), and which is often referred to as "gateway" below. Such equipment, installed on the premises of a customer (which may in particular be a home or a business) of a telecommunications operator or of a services provider, is an interconnection element that gives access to the services to which the customer has subscribed and to the applications used by the customer or by the operator for management and supervision purposes. Specifically, as its name indicates, it constitutes a genuine gateway between firstly the network of the services provider or operator and secondly the local network of a customer:

in terms of connectivity—a residential gateway is connected to the operator's network(s) on one side, and on a customer side it provides a set of various interfaces, e.g. a wireless interface such as a wireless local area network (WLAN), or a Bluetooth network, an RJ11 socket for a telephone, RJ45 socket for digital TV and computers, or universal serial bus (USB) sockets;

in terms of services—it makes it possible to manage all of the services to which the customer has subscribed, and the functions that give access to those services: telephony, television, Internet connection, equipment that is connected thereto, network address translator (NAT) rules, firewall rules, etc.; and in terms of applications—by way of example, it includes software specific to the operator for supplying services to the operator's customers, for diagnostic purposes, or for automatically managing software updates.

For reasons of concision, it is said below that a gateway "provides" a telecommunications service to the user of the gateway, even though, in fact, the gateway merely enables the user to access the service.

In spite of their ever wider presence within the homes of the general public, for most users such gateways remain pieces of equipment that are poorly controlled or indeed "mysterious". Worse, once the gateway has been installed on subscribing to the service (assuming that customers perform their own installation), most users no longer takes action on the equipment. As a result, such gateways generally constitute "black boxes" that are poorly known to their users, even though they constitute the central node that gives access to all of the services that users make use of daily.

This poor knowledge even leads to this equipment being held in contempt, often being considered as constituting a pointless extra expense (since the gateway is usually leased to the customer), or as equipment that needs to be restarted electrically if there is a problem affecting any of the services provided by this equipment.

Most gateways have a web interface for configuration and management purposes that is accessible in protected manner via the hypertext transfer protocol (HTTP). This interface is accessible via a uniform resource locator (URL) that may be in the form of a predefined address (e.g. the IPv4 address "192.168.1.1", or a specific service name such as "MyBox"); an identifier and a password are generally required to access it in "administrative" mode. Once authenticated, the customer (user) can then access various tools making it is possible to act directly on the services and connections managed by the gateway. Most customers have little knowledge about this administrative interface of the gateway. Furthermore, in order to be able to take advantage of it, a customer must generally be familiar with technical terms used for describing such services, otherwise the customer will not be able to predict exactly the impact of any modifications made using the administrative interface.

In other words, accessing the management elements (even at a basic level) of a gateway requires some minimum level of knowledge on the part of general public customers, thereby necessarily reducing the number of customers who are capable of making use of these functional facilities. Something that may appear from the operator's point of view as a guarantee of security (since the risk of people with little knowledge compromising the system is reduced), simultaneously serves to prevent such people from having means to control simple functions of the gateway.

This ignorance is particularly harmful when better knowledge about the gateway would certainly give customers better control over the operation of the services to which they have subscribed, thereby minimizing any need to call a technical assistance hotline in the event of an observed malfunction (e.g. when the user of a gateway can no longer access any one of the telecommunications services that would normally be accessible via the gateway, or when the level of quality of any one of the services normally accessible via the gateway is degraded compared with its nominal level). Specifically, most basic function, and even advanced functions, can be managed directly using the gateway. Unfortunately, most general public customers do not have sufficient knowledge to be able to manage those functions directly, which leads to an increase in calls to the technical assistance hotline in the event of a malfunction being observed, even though some such malfunctions can easily be solved by acting directly on the gateway. Given the cost to service providers and operators of managing technical assistance services, and ignoring any impact on their image (waiting time, call costs), it is important to put solutions into place that are effective in reducing the number of calls to the technical assistance services of service providers and operators.

The systems presently available to general public customers for restoring service present in particular the following limitations:

managing faults requires the customer to call the service provider or operator in order to indicate that a service is unavailable or degraded; furthermore, if the gateway has become incapable of connecting to the network and if the customer's telephone line is connected to the gateway (as applies with VoIP), the telephone line is unavailable, so the customer cannot use it for calling the technical assistance service;

customers do not know whether the operator has taken action in order to resolve faults that are affecting a service to which they have subscribed;

the time expected to resolve faults is not known in advance; and the service is unavailable during the time taken by the services provider or the operator to resolve a fault; in this respect, it should be observed that certain operators presently make use of a procedure for lending equipment (e.g. a "3G key") in order to enable certain customers to continue to access the Internet; this commercial approach has several drawbacks, e.g. the customer must go to a shop, or the customer does not necessarily have access to all of the services that have been subscribed to: specifically the customer then has access only to services that can be obtained directly from access to the Internet; in particular, access to the digital TV service (IPTV) is not guaranteed.

SUMMARY

The present invention thus relates to a service continuity method comprising a step of detecting a fault consisting in at least one service to which a residential gateway normally provides access no longer being accessible or in the quality of service of at least one service to which a residential gateway normally gives access being degraded. Said method is remarkable in that it then comprises the following steps:

a) a supervision center selecting at least one mobile relay;

b) said supervision center communicating at least one instruction to the selected mobile relay for the purpose of ensuring continuity of said service;

c) said mobile relay setting up a session association with said gateway or with an intermediate device; and d) the traffic relating to said service being redirected to the mobile relay.

It should be observed that the invention applies to any type of mobile relay. Naturally, an operator may make use simultaneously of mobile relays of different types in order to construct a backup architecture, or in addition to the operator's network infrastructure.

In a first example, said mobile relay is a drone. Although initially developed for military purposes, over the last few years drones have become highly successful in the field of surveillance or inspection services. The authors of the present invention have realized that this technology can also be of great interest in the field of telecommunications and providing digital services. Specifically, and as described in detail below, an architecture relying on a fleet of drones can be used to provide backup access to IP services to which a customer has subscribed, as a replacement for the normal network architecture, or in addition thereto. Advantageously, the fleet of drones can be deployed very quickly in desired locations.

In a second example, said mobile relay may be an autonomous vehicle, i.e. a self-driving vehicle. Specifically, the authors of the present invention have realized that, given the availability of vehicles fitted with radio transceivers and data collection equipment (such as effective geolocation systems or sensors), it is possible to envisage using autonomous vehicles (such as cars or vans) as mobile relays.

By means of these provisions, a residential gateway can continue to give the service(s) to which the user of the gateway has subscribed even when events of some other nature have the effect of degrading the level of quality associated with a service to which the residential gateway gives access. The invention thus guarantees continuity for one or more services in the event of faults located in gateways (including when the fault affects a main member of the gateway) or in their neighborhood (in particular the home local network).

The invention also makes it possible to respond to network engineering constraints which, instead of relating to a failure located on the customer connection segment, relate to other needs of the operator, such as the failure of a node of the access network, or the need to absorb an observed or predicted overload on a portion of the network, or indeed to execute planned maintenance operations.

It should be observed that the service continuity means of the invention advantageously do not involve any action on the part of the customer. Optionally, it is naturally possible to keep the customer informed of progress in handling the fault, while making sure that the procedures for detecting and resolving faults remain transparent for the client. In any event, the invention significantly improves customer experience and satisfaction.

According to particular characteristics, said session association is performed using:

a backup identifier that is broadcast by said mobile relay, and that is listened for and recognized by said residential gateway or by said intermediate device; or a backup identifier that is broadcast by said residential gateway or by said intermediate device and that is listened for and recognized by said mobile relay.

By means of these provisions, a faulty gateway (or an intermediate device) can automatically initialize a session association with a mobile relay situated in the proximity of the gateway.

According to other particular characteristics, following said step b), said supervision center adjusts the geographical position of said mobile relay as a function of the geographical position of the gateway(s) for which the mobile relay is providing service continuity.

By means of these provisions, said session association is optimized and disturbance caused to ongoing connections is minimized.

Correspondingly, in a second aspect, the invention provides various devices.

Firstly, the invention thus provides a mobile relay. Said mobile relay is remarkable in that it includes means for acting, following the detection of a fault consisting in at least one service to which a residential gateway normally gives access no longer being accessible or in the quality of at least one service to which said gateway normally gives access being degraded, to:

receive from a supervision center at least one instruction for providing continuity of said service;
where necessary, adjust its geographical position as a function of the geographical position of the gateway;
establish a session association with the gateway or with an intermediate device between itself and the gateway; and
take charge of the traffic relating to said service.

According to particular characteristics, said mobile relay further comprises means for broadcasting a backup identifier.

According to other particular characteristics, said mobile relay further comprises means for listening for and recognizing a backup identifier broadcast by said residential gateway or by said intermediate device.

As mentioned above, said mobile relay may advantageously be onboard a drone or an autonomous vehicle.

Secondly, the invention also provides a residential gateway, said residential gateway is remarkable in that it includes means for acting, after a fault consisting in at least one service to which said gateway normally gives access no longer being accessible or in the quality of a service to which it normally gives access being degraded has been detected, to establish a session association with a mobile relay including means for adjusting, where necessary, its geographical position as a function of the geographical position of the gateway, or with an intermediate device between the gateway and said mobile relay, and to transfer thereto the traffic relating to said service.

According to particular characteristics, said residential gateway further includes means for broadcasting a backup identifier.

According to other particular characteristics, said residential gateway further includes means for listening for and recognizing a backup identifier broadcast by said mobile relay.

The advantages made available by these devices are essentially the same as those made available by the corresponding methods set out briefly above.

It should be observed that it is possible to implement these devices in the context of software instructions and/or in the context of electronic circuits.

The invention also provides a computer program downloadable from a communications network and/or stored on a computer readable medium and/or executable by a microprocessor. The computer program is remarkable in that it includes instructions for executing steps of the service continuity method set out briefly above when it is executed on a computer.

In a third aspect, the invention relates to a service continuity system comprising at least one mobile relay as described briefly above, and at least one residential gateway as described briefly above.

The advantages made available by the system are essentially the same as those made available by the service continuity method described briefly above.

BRIEF DESCRIPTION OF THE DRAWINGS

Other aspects and advantages of the invention appear on reading the following detailed description of particular embodiments, given as non-limiting examples. The description refers to the accompanying figures, in which.

DETAILED DESCRIPTION OF ILLUSTRATIVE EMBODIMENTS

As explained briefly above, the invention enriches the capabilities and the intelligence of a residential gateway in order to ensure continuity of services via at least one mobile relay in the event of said gateway being faulty (as defined above). Gateways must naturally be configured in order to implement the invention; this configuration may be performed statically or dynamically, e.g. using protocols such as dynamic host configuration protocol (DHCP) or customer-premises equipment (CPE) WAN management protocol as specified in technical report 69 (TR-69).

There follows a description of an implementation of the service continuity method of the invention. By way of example, it is assumed below that the mobile relays are drones.

In the figures that illustrate this implementation and as described below, identical notation designates objects that are identical or analogous.

In a step E1, a network entity detects a fault relating to a gateway connected to the network. It should be observed that a plurality of services may fail simultaneously. In particular, a faulty service will have the consequence of causing all services that rely on the failed service to be unavailable: for example, the Internet access service being unavailable can prevent electronic message communication and can prevent telephone calls being set up.

Figure 1:
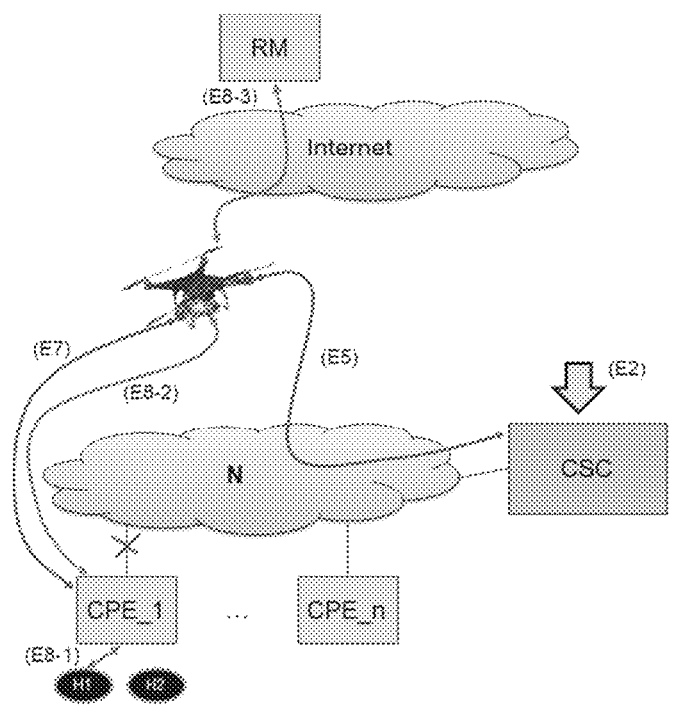
FIG. 1 shows the use of a single drone to enable a user of a faulty gateway to communicate with a correspondent connected to the Internet, the drone receiving its instructions via the network to which said gateway is connected.

FIG. 1 shows gateways CPE_1, CPE_2, . . . , CPE_n that are connected to a network N. The gateway CPE_1 normally provides access to telecommunications services for machines given references H1 and H2. It is assumed in this example that a fault affects at least one service to which the user of the machine H1 has subscribed, e.g. communication between that user and a correspondent having a remote machine (RM) connected to the Internet.

In a step E2, at least one CPE supervision center (CSC) server is informed about said fault. It should be observed that in the context of the present invention, the term "server" designates a logical entity that is functionally responsible for receiving requests, for taking decisions, and for answering requests; no particular apparatus structure or particular network architecture is implied by the use of this term.

The CSC server may be subdivided into a plurality of individual functions that may be hosted on a single network node or that may be distributed over a plurality of nodes.

It should also be observed that an operator network may have a single CSC server or a plurality. For example, it is possible to place one CSC server in the network upstream from the gateway, and to place another on board a drone.

In a first variant, said network entity that has detected the fault is directly associated with a CSC server. This applies in particular when the "fault" is in fact unavailability due to a planned maintenance operation on lines that impact the gateway.

In a second variant, said network entity that detects the fault is not directly associated with a CSC server. For example, it might be a network entity connected to supervision equipment, or a network entity that receives either an explicit notification sent by the gateway, or else an incident ticket sent by another element of the operator's network. Under such circumstances, the network entity that detects the fault sends at least one fault report to at least one "CSC" server. Such a fault report contains information about the fault, such as the identity of the customer, the type(s) of faulty service(s), an identifier of the gateway, e.g. its media access control (MAC) address, or the geographical position of the gateway.

In a step E3, the CSC server that detects the fault or that is informed about the fault, uses the information it has received to determine whether the observed incident can be solved quickly, e.g. by means of connection equipment or of an operating system (OS) or "daemon" service (i.e. a software process activated by the gateway), or restarting a network interface, or indeed installing a new configuration on the gateway (which installation may indeed be activated by a mobile relay, after associating the mobile relay with the gateway and executing appropriate commands).

At least when the observed incident cannot be resolved in this way, the CSC server acts in a step E4 to initialize appropriate operations for resolving the origin of the failure, and implements the services continuity method of the invention for the time taken by technical teams to resolve the incident, or for the time needed for providing the customer with some other backup solution; which backup solution may consist, by way of example, in providing and using a universal serial bus (USB) key or "dongle", such as a 3G key, a WiFi key, or a TV key for installing on the gateway or some other piece of equipment such as a computer or a TV set.

On the basis of the geographical position of the line in question, and/or on the basis of information present in operator databases providing configuration information concerning customers or the failed network element, and also on the basis of other information (e.g. the traffic loads on the drones in service, or power supply levels of the drones), the CSC server begins by executing an algorithm for selecting one or more drones that are to take charge of providing service continuity.

Figure 2:
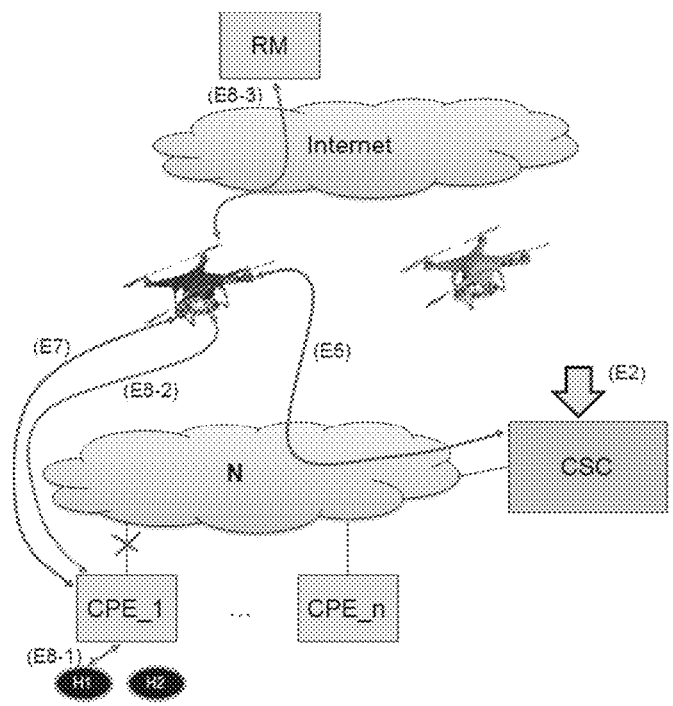
FIG. 2 shows the use of a drone to enable a user of a faulty gateway to communicate with a correspondent connected to the Internet, the drone forming part of a fleet of two drones and receiving its instructions via the network to which said gateway is connected.

To do this, the CSC server has an up-to-date inventory of the drone fleet in service. This fleet may comprise a single drone (cf. FIG. 1) or a plurality (cf. FIG. 2). Furthermore, the CSC server maintains a database (e.g. associated with a geographical map) that records the locations of the drones in service. A drone of the fleet is in an "active" state when it is involved in at least one service continuity procedure, or it is in a "passive" state when it is waiting for instructions from a CSC server. Preferably:

each of the active drones regularly sends its geographical position to the CSC server, together with other information such as its loading or the availability of the backup services for which it is configured; and a drone in "passive" mode may make rounds specified by the CSC, or may always go to an optimum position that enables it to take action quickly within a predefined region.

Drones may carry geographical reconnaissance mechanisms to facilitate locating stopping places. These places may be predetermined by a CSC server.

A CSC server may select drones using predetermined criteria, such as predefined regions of action, or on the basis of types of customer (e.g. professional customers v. non-professional customers), or indeed depending on the failed service, or indeed depending on the intrinsic characteristics of the drones (such as their communications capabilities or their endurance).

It should be observed that in addition to providing service continuity, a mobile relay may, where necessary, be instructed by a CSC server to deliver a "dongle", or even a spare gateway, to a customer.

The CSC server also maintains records concerning the power supply of the drones, any maintenance operations planned for each of the drones, their loading, the faulty gateways connected via each of the drones, and of the services provided; by way of example, a drone may act as a session initiation protocol (SIP) proxy, a multicast listener discovery (MLD) proxy, or an Internet group management protocol (IGMP) proxy.

The CSC server may select a drone that is active or passive (as defined above). If it selects an active drone and if the drone is to provide connections to a plurality of customers, the CSC server preferably makes sure that the drone has sufficient capacity in terms of loading (and optionally in terms of safety functions and/or quality of service (QoS) functions); furthermore, the CSC server may adjust the geographical position of said drone so as to minimize any disturbance to ongoing connections, which adjustment involves the drone moving to a new position while ensuring continuity for active sessions.

The algorithm for selecting drones and adjusting their geographical positions may be performed in distributed manner so as to avoid using a centralized computation server.

The drone selection algorithm may also take other input parameters, such as the location of the faulty gateway, the locations of the drones, the up-to-date loading of the drones, or the failed service in question. By way of example, the CSC server may select the drone for which the distance to be traveled to reach the target position is the best. This criterion enables assistance to be given to the faulty gateway and gives it access to IP services as quickly as possible.

The CSC server may coordinate the synchronization procedure between two drones of the fleet in order to anticipate a low battery or any other failure of the active drone. Thus, a drone may take over from another active drone. Once the take-over procedure has been executed, the first drone can then take on the passive state.

In a step E5, the CSC server sends at least one instruction to the connected drone, e.g. relating to the global positioning system (GPS) coordinates of the location to which it is to go, the customer in question, one or more identifiers (e.g. MAC addresses) of gateways or of "dongles", the identifiers of the services in question, and any other useful information.

The message used for conveying these instructions is referred to as "ACTION( )". The CSC server can thus use an ACTION( ) message to instruct a drone to go to a maintenance base of the fleet, or to stand by for new instructions from the CSC server.

Figure 3:
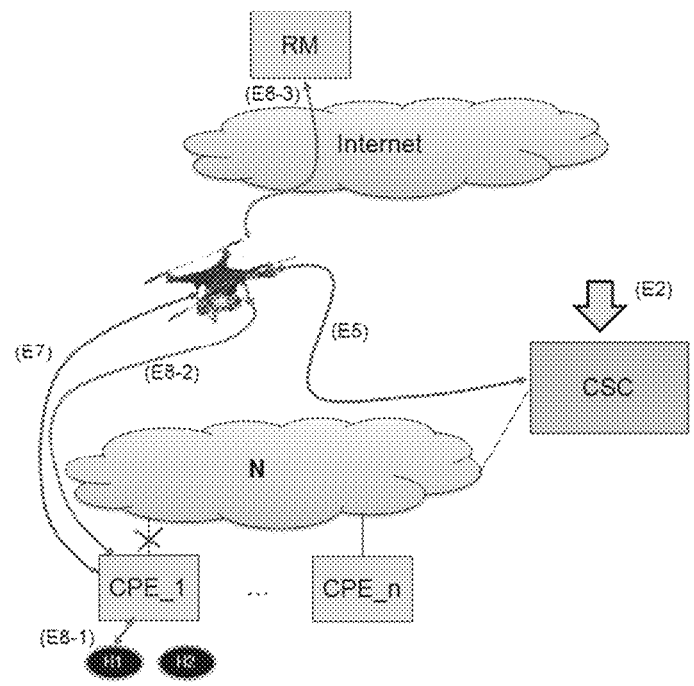
FIG. 3 shows the use of a drone to enable a user of a faulty gateway to communicate with a correspondent connected to the Internet, the drone receiving its instructions via a network other than the network to which said gateway is connected.

As shown in FIG. 1, communication between the CSC server and the drones may be set up via the same network as is used for serving customers. In a variant, and as shown in FIG. 3, communication between the CSC server and the drones may be set up via a network other than the network used for serving customers. The network may be an IP network, or a network involving some other technology, e.g. WLAN technology, satellite technology, or long-term evolution (LTE) technology, also known as 4th generation (4G) technology. This variant serves in particular to mitigate greater infrastructure problems and to take action on problems where terrestrial infrastructure is in danger (e.g. after an earthquake or a nuclear accident); during such exceptional events, the invention can be used to convey priority traffic (e.g. emergency calls), or indeed all traffic.

A stage of mutual authentication between a CSC server and the drones of the fleet is preferably put into place. The purpose of this procedure is to avoid malicious use of drones by a non-authorized server. The drones should accept commands only when they come from an authenticated CSC server. For example, an access list may be configured in each drone to specify the CSC server(s) that is/are authorized to give it instructions. If an instruction comes from any server that is not on that list, a drone will not take account of that instruction. The drone may optionally store in a file any non-authenticated configuration requests or any non-authorized instructions. Systems for authenticating exchanges and for keeping them confidential may be implemented in order to improve the security of the service continuity method of the invention.

Figure 4:
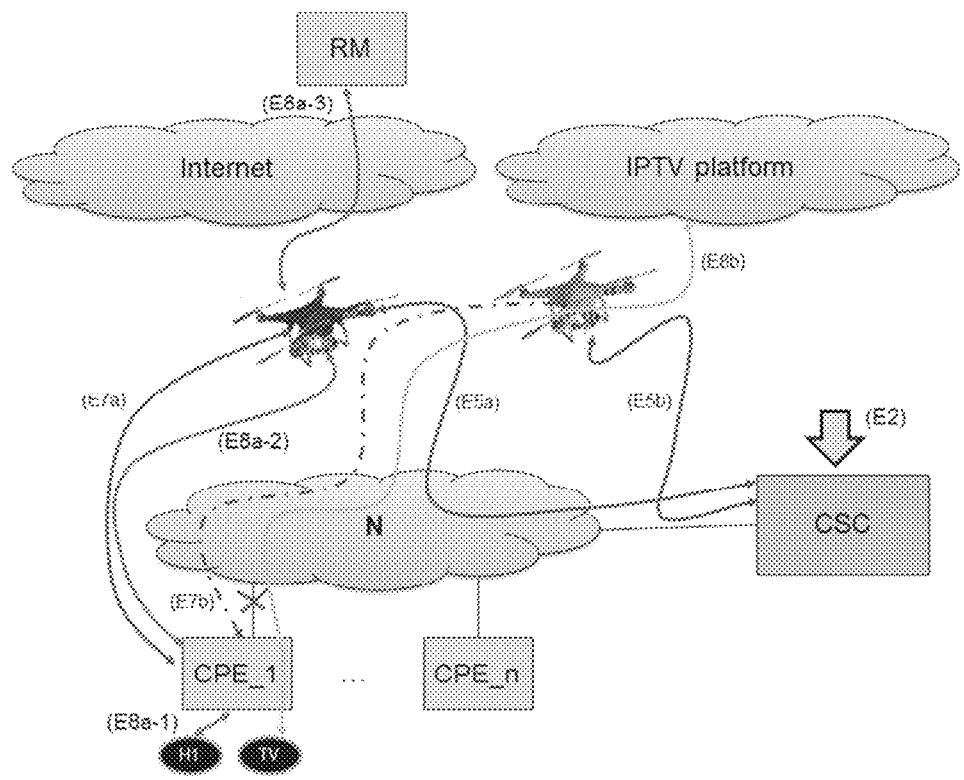
FIG. 4 shows the use of a first drone for enabling a user of a faulty gateway to communicate with a correspondent connected to the Internet, and of a second drone to provide continuity of the IPTV service of said gateway.

On receiving notification of a fault or of service degradation, a CSC server may decide to involve one or more drones. A single drone can be used to provide all services. In a variant, a plurality of drones may be involved, each drone possibly taking charge of one service only, or of a plurality of services; for example, in FIG. 4, a first drone provides continuity of the Internet service (specified by (a) in FIG. 4) to which the machine H1 has access, and a second drone provides continuity of digital television service (specified by (b) in FIG. 4).

Figure 5:
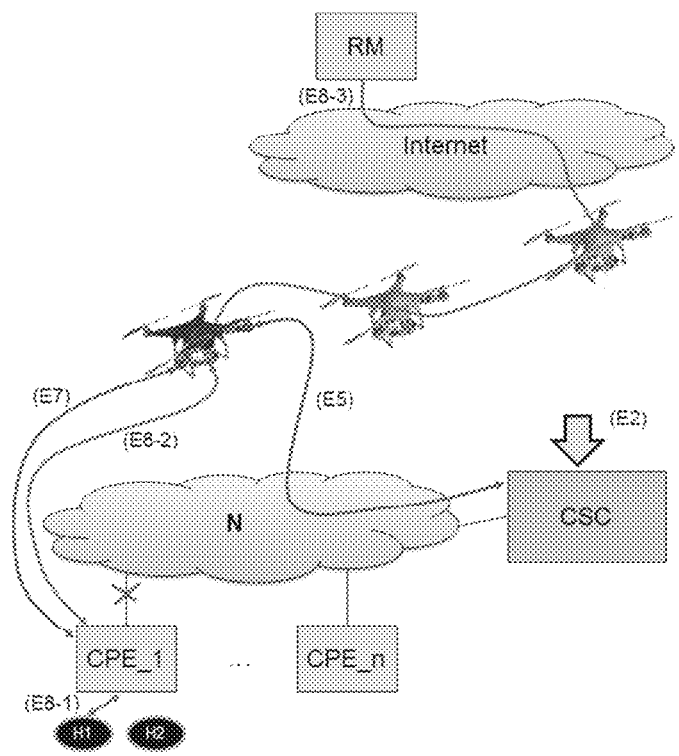
FIG. 5 shows the use of a string of three drones to enable a user of a faulty gateway to communicate with a correspondent connected to the Internet.

The parameters of the ACTION( ) message may be as follows:

"codes": specifies the code of the action; here are some examples:

"0": instructs said drone to return to a maintenance base; the location of the maintenance base is specified by the "new position" attribute;

"1": instructs taking charge of a faulty gateway;

"2": instructs switching active contexts to another drone of the fleet;

"3": instructs a summary of active contexts; this code is used for purposes of synchronizing drones of the fleet;

"4": instructs updating the routing table; specifically, a drone may relay messages received from faulty gateways to another drone or to a network connection point, e.g. using a WLAN access point, or passing via a network in compliance with the 3G (UMTS) or 4G (LTE) standard of the 3rd generation partnership project (3GPP); the new routing table (or merely an update) is also included in the ACTION( ) message; FIG. 5 shows a situation in which the drones of the fleet are configured to relay customer traffic to other drones of the fleet, and the user of the machine H1 can communicate with a correspondent RM connected to the Internet via a string of three drones; and "5": instructs the drone to purge its access control filters (defined below).

"New Position": gives the new GPS position to which the drone is to go.

"ACL": specifies which access control filters to be applied; this parameter may include an access control rule based on one or more MAC addresses, or on a login and password; this parameter is optional; it is used to identify the faulty gateways to be taken in charge by the drone.

"Service Codes": this parameter includes the identifier(s) of the service(s) in question; the relay drone takes charge only of those services that are specified by this parameter; the drone will reject requests to connect with services that are not included; requests that are rejected may be stored in a dedicated file; this parameter makes it possible to specify a code or a plurality of codes; here are some examples of values that may be taken by this parameter:

"0" (or "ANY"): indicates all services;

"1": indicates the "Internet" service;

"2": indicates the "VoIP" service;

"3": indicates the "IPTV" service;

"4": indicates the "video on demand" (VoD) service; and

"5": indicates backup services.

"Routing/Forwarding Entries": specifies one or more entries of the routing table; by way of example, this parameter is provided if an ACTION( ) message having the code "4" is sent to a drone.

"Sub-Code": specifies one or more specific actions concerning the operation identified by the "Codes" parameter; by way of example, the Sub-Code parameter may be used to inform the drone that it needs to activate a certain configuration of the gateway (Sub-Code 0), or to update the software of the gateway (Sub-Code 1).

Naturally, the above list of parameters is not exhaustive; other parameters may be defined to satisfy new functional requirements. Furthermore, the above-described structure for the ACTION( ) message is provided merely by way of example; it is possible to envisage other formats; it is thus possible to define specific messages for each of the operations identified by the "Codes" field.

A CSC can give instructions to one or more drones relating to one or more actions to be executed by the drone(s) on a single gateway. These actions may be communicated to the drone(s) using one or more ACTION( ) messages.

In a step E6, the relay drone executes the instructions of the CSC server. By way of example:
- it may position itself at new GPS coordinates sent by the CSC; a relay drone can adjust its position to take charge of a new faulty gateway, while still guaranteeing service continuity for other faulty gateways;
- it may activate the service components in question for the faulty gateway (e.g.: Internet/VoIP/IPTV, VoIP only, VoD only, VoIP and IPTF, or Internet only);
- it may wake up the WLAN interface of the faulty gateway, e.g. by using the wake on wireless LAN (WoWLAN) protocol, so as to reduce the time required for reestablishing the service; or
- it may update its routing table.

In a step E7, the relay drone establishes a session association with the faulty gateway. In a variant, an intermediate device between the drone and the gateway is used; in other words, the drone associates itself with an intermediate device, and it is the intermediate device that is associated with the gateway.

Various connection technologies can be used for this association, e.g. any of the following technologies: WLAN; LTE; general packet radio service (GPRS); or WIMAX (standard 802.16 of the Institute of Electrical and Electronics Engineers (IEEE)).

Preferably, a backup identifier, dedicated to performing the present invention, is configured in the drones and in the gateways performing the invention.

More precisely, in a first variant:
- a drone of the invention broadcasts a backup identifier via the interface corresponding to the connection technology used between the drone and at least one gateway or an intermediate device of the invention; and
- a gateway or an intermediate device of the invention must be capable of behaving as a customer terminal, i.e. the gateway or the intermediate device must be capable of setting up a session association with a relay drone of the invention behaving as an access point.

In a second variant:
- a gateway or an intermediate device of the invention broadcasts a backup identifier via the interface corresponding to the connection technology used between the gateway or the intermediate device and at least one drone of the invention; and
- a drone of the invention must be capable of behaving as a customer terminal, i.e. the drone must be capable of setting up a session association with a gateway or an intermediate device of the invention behaving as an access point.

Naturally, these two variants may be combined.

A faulty gateway, or an intermediate device, can thus automatically initialize a session association with a drone situated in the proximity of the gateway.

It should be observed that the backup identifier of the invention should not be confused with the "SSID" that is conventionally used by WLAN access points for local usage; it should be recalled in this example that a service set identifier (SSID) is the name of a WLAN network (commonly referred to as "WiFi") in compliance with the IEEE 802.11 standard, and that it should be listened for by terminals in order to enable them (if authorized) to connect with a "WiFi" access point broadcasting a certain SSID.

In order to avoid any session association with a usurper device, gateways and drones of the invention preferably use preconfigured association keys. The association keys may have a lifetime that is limited in order to avoid fraudulent use of the system. The operator may use dynamic configuration protocols for updating said association keys.

The relay drone uses the access filters to monitor gateways that might connect therewith. In particular, the drone implements a filter on the basis of the MAC address as communicated by a CSC server.

If the association takes place successfully, an IPv4 address, an IPv6 prefix, or both are allocated by a relay drone to a faulty gateway. The IP routing table of the faulty gateway is then modified accordingly.

Once the association has been achieved successfully, the relay drone informs the CSC server. The customer may be notified that the service that had failed is once more operational. When implementing the invention provides a level of service that is similar to the nominal level, it is possible to omit notifying the customer, so as to make detection and resolution of the fault as transparent as possible for customers.

Once the association has been set up, in a step E8 the gateway is once more connected to the network. All of the traffic of the faulty gateway, or at least the traffic for the service in question, is redirected via at least one relay drone selected by the CSC server, thus enabling the customer to access the services to which the customer has subscribed.

Thus, in FIGS. 1, 2, 3, and 5, the user of the machine H1 is put into communication (links E8-1, E8-2, and E8-3) with the correspondent RM via a drone. The same is true in FIG. 4 (links E8a-1, E8a-2, and E8a-3).

Figure 6:
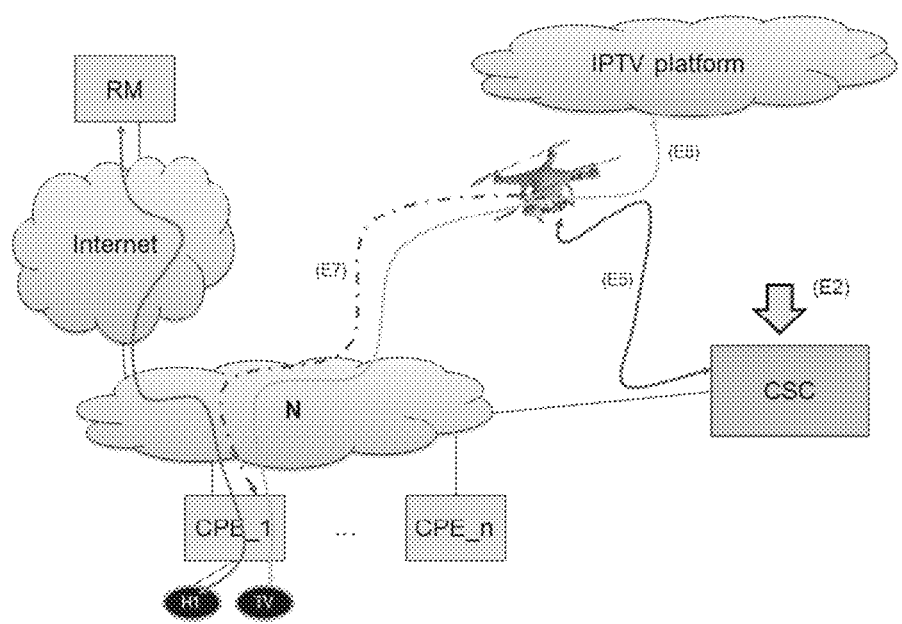
FIG. 6 shows the use of a nominal path to enable a user of a gateway to communicate with a correspondent connected to the Internet, with simultaneous use of a drone to provide the continuity of the IPTV service of said gateway.

When only one service has failed, while the other services remain operational, the relay drone may be activated specifically for the service in question, with the other services using the nominal path for providing the service. Thus, in FIG. 6, continuity of the digital television service (IPTV) involves a relay drone, while the Internet service (to which the machine H1 has access) uses a nominal routing.

In order to avoid data piracy and in order to keep exchanges confidential, the traffic sent to a relay drone may be encrypted. Preferably, the user of the gateway does not have the right to access the configuration parameters of the service continuity interface; in particular, the user cannot access the association and/or encryption keys that are stored locally.

The MAC address of the faulty gateway (or any other unique identifier of the gateway, such as a serial number) is inserted in the data transmitted by the faulty gateway. A MAC address makes it possible to identify the faulty gateway in a manner that is not ambiguous, regardless of which drone is used. The MAC identifier may be used by the drone to apply operator policies (e.g. keep the same address for all traffic transmitted via a given faulty gateway).

When the main line becomes operational once more, or when the operator provides the customer with some other backup solution (e.g. installing a dongle on the gateway), then in a step E9, the CSC coordinates withdrawal of the relay drone. The gateway uses the main (or nominal) access to convey new sessions. For ongoing sessions, the relay drone may be maintained in the communication path, or it may be withdrawn if the session can be transferred to a nominal path without any session continuity problem; specifically, withdrawing the drone may have negative consequences on an ongoing session if the system does not have mechanisms suitable for notifying the remote machine of the availability of another IP address.

There follows a description of the invention being applied to two types of service that are very widespread.

Figure 7:
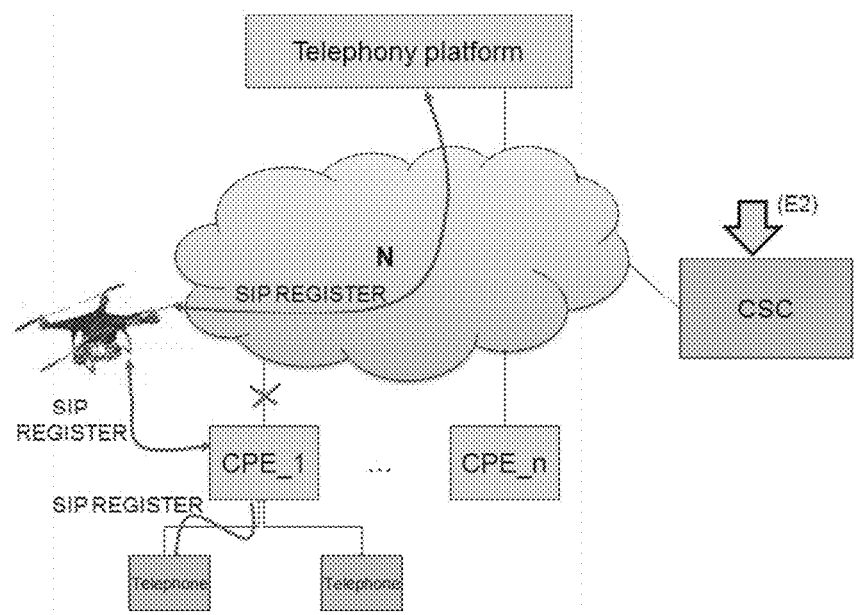
FIG. 7 shows a customer using the SIP protocol to register with a telephone service platform via a relay drone.

In order to provide continuity or voice over IP services, the gateway has an onboard proxy function, e.g. proxy SIP, for relaying registration requests (SIP REGISTER) (cf. FIG. 7) sent by a voice terminal to another telephony service platform, e.g. via a session border controller (SBC) or a proxy-call session control function (P-CSCF); it is these SIP signaling messages that determine access to the voice service, i.e. that enable the customer to register with the service, and then set up and receive calls. It should be observed that the identifiers of the telephone line remain the identifiers of the faulty telephone line, even when making use of a relay drone.

Figure 8:
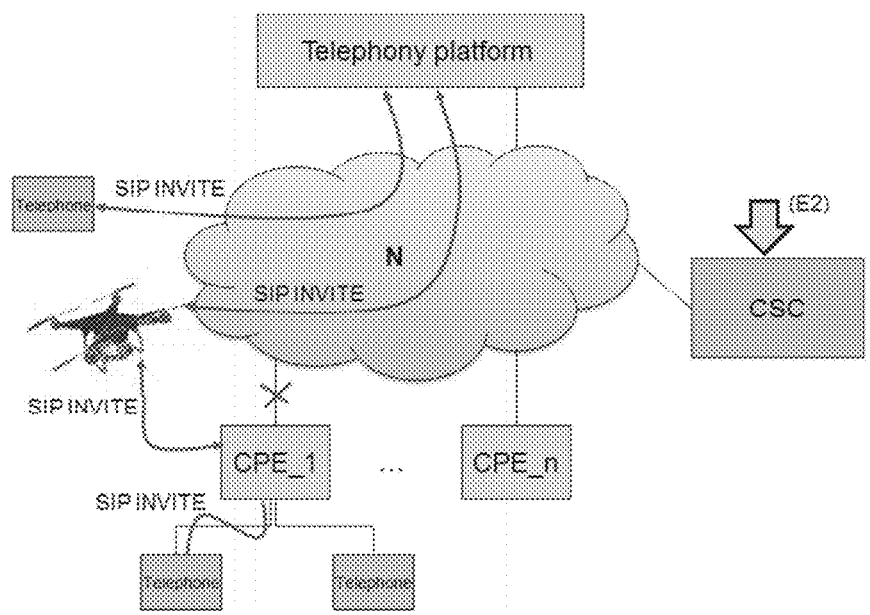
FIG. 8 shows a telephone call being set up using the SIP protocol via a relay drone.

FIG. 8 shows an example of setting up a telephone call via a relay drone, in which a session setup request (INVITE) in compliance with the SIP protocol is passed. However the invention applies equally well to signaling protocols and media stream exchanges other than by SIP, e.g. IAX, H.323, or WebRTC.

Figure 9:
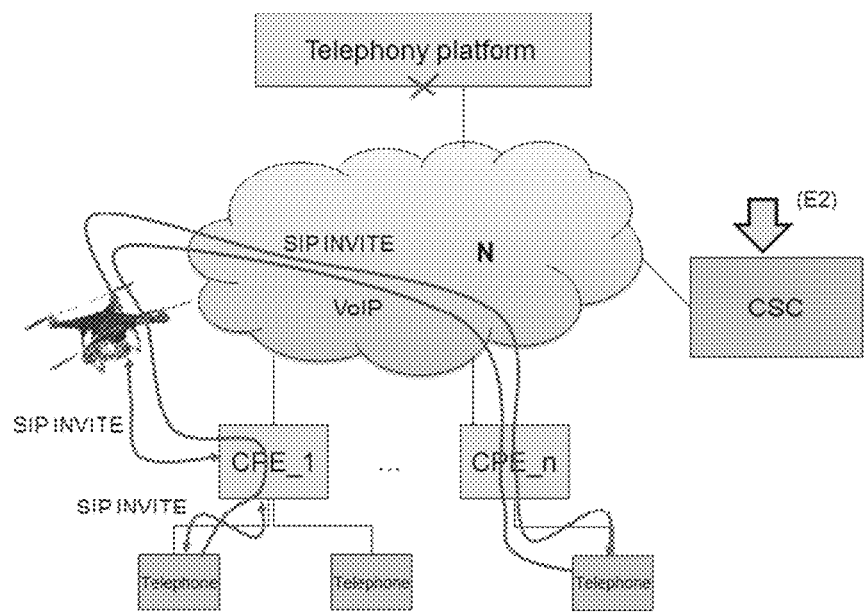
FIG. 9 shows the use of a drone to enable customers in a common geographical region to be put into VoIP communication in the event of a voice service platform being unavailable.

As shown in FIG. 9, in the event of a voice service platform being unavailable, it is possible to use a drone to enable customers in a given geographical region to communicate by voice. Thus, the drone has onboard registration server functions, proxy server functions, or announcement server functions. The drone can thus set up local calls between customers, and can relay calls to a voice interconnection node or to the public switched telephone network (PSTN). For setting-up purposes, the drone maintains a customer registration database on the basis of REGISTER messages that it processes locally.

The drone may also be configured to respond to any call setup request by an audio announcement message. Thus, the caller may be redirected to an announcement server playing an audio file, e.g. providing information explaining that the service is unavailable, or inviting the caller to try again later.

In order to ensure digital television service continuity, or video on demand (VoD) service continuity, the drone has an onboard proxy function, e.g. an IGMP proxy or MLD proxy, for relaying messages starting or ending a subscription to an IPTV content broadcast service (in particular TV program broadcasts) as sent by the set top box (STB) connected to the gateway to the access equipment in charge of processing such subscription messages; it is these signaling messages that determine access to the IPTV content desired by the customer, i.e. the TV program that the customer seeks to access. The corresponding traffic is conveyed along distribution trees that are calculated and established using the IP multicast transmission mode. Each termination of the tree is situated in a piece of access equipment that connects various customers seeking to receive the content.

When a fault arises on the line connecting the customer to the network, the signaling traffic is redirected to a relay drone that has the appropriate proxy function on board. The proxy function of the relay drone then takes charge of relaying new requests to start or end a subscription to an IPTV content broadcast service as sent by the IPTV receiver(s) connected to the faulty gateway. These requests are processed by the access equipment to which the relay drone is connected. Once the start of subscription request has been processed, the traffic characteristics of the requested IPTV content is conveyed by the access equipment to the relay drone, which forwards it to the gateway whose connection line is down, which gateway finally conveys it to the IPTV receiver.

Figure 10:
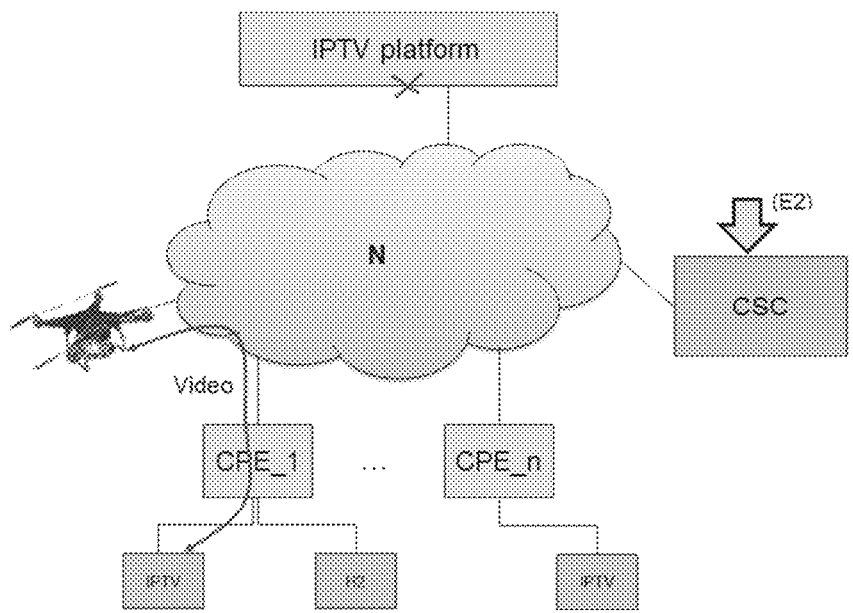
FIG. 10 shows video content being broadcast to a customer from a drone, in the event of a failure of an IPTV service platform.

Optionally, a drone may have on board an announcement server for broadcasting video/audio information in the event of a TV service platform being unavailable, or during events associated with natural disasters, for example. FIG. 10 shows video content being broadcast to a customer from a drone in the event of a fault in an IPTV service platform.

To close, there follows a description of a mobile system for recharging drone batteries and for storing drones. The purpose of this system is to improve the endurance of drones during operations in which they are active, or to retrieve drones that are remote from their maintenance base.

One or more vehicles capable of recharging the batteries of the drones in question are deployed for this purpose. These vehicles have an onboard charging station to which at least one drone may be attached in order to recharge its battery.

The vehicle may be controlled by a CSC using an ACTION( ) message. The message informs the vehicle of the action to be undertaken; for example, it gives the GPS coordinates of the region to which it is to go in order to retrieve a drone, in order to recharge its battery, or in order to return it to a maintenance base of the fleet of drones.

Once it has reached the region in question, the vehicle can retrieve the drone. A drone that is connected to a vehicle for recharging its batteries can continue to preserve service continuity for gateways that need it (i.e. while the incident is still being resolved).

Once recharging is complete, the autonomous vehicle releases the drone and sends a notification message to the CSC server.

The invention may be implemented within nodes, e.g. residential gateways, or mobile relays, communications networks, by means of software and/or hardware components.

The software components may be integrated in a conventional computer program for managing a network node. That is why, as mentioned, the present invention also provides a computer system. The computer system comprises in conventional manner a central processor unit using signals to control a memory, and also an input unit and an output unit. In addition, the computer system may be used to execute a computer program including instructions for performing any service continuity method of the invention.

Specifically, the invention also provides a computer program that is downloadable from a communications network and that includes instructions for executing steps of a service continuity method of the invention when it is executed on a computer. The computer program may be stored on a computer readable medium, and may be executable by a microprocessor.

The program may use any programming language, and be in the form of source code, object code, or code intermediate between source code and object code, such as in a partially compiled form, or in any other desirable form.

The invention also provides a non-removable or a partially or totally removable data medium that is readable by a computer and that includes instructions of a computer program as specified above.

The data medium may be any entity or device capable of storing the program. For example, the medium may comprise storage means such as a read only memory (ROM), e.g.

a compact disk (CD) ROM, or a microelectronic circuit ROM, or magnetic recording means, such as a hard disk, or indeed a USB flash drive.

In addition, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any service continuity method of the invention.

Although the present disclosure has been described with reference to one or more examples, workers skilled in the art will recognize that changes may be made in form and detail without departing from the scope of the disclosure and/or the appended claims.

The invention claimed is:

1. A service continuity method comprising:
a step of detecting a fault comprising at least one service to which a residential gateway normally provides access no longer being accessible or in a quality of service of at least one service to which the residential gateway normally gives access being degraded, then performing the following steps:
a) a supervision center (CSC) selecting at least one mobile relay;
b) said supervision center (CSC) communicating at least one instruction to the selected mobile relay for the purpose of ensuring continuity of said service;
c) said mobile relay executing said at least one instruction communicated by the supervision center and setting up a session association with said residential gateway or with an intermediate device; and
d) traffic relating to said service being redirected to the mobile relay,
wherein, following step b), the supervision center (CSC) adjusts where necessary the geographical position of said mobile relay as a function of a geographical position of the residential gateway for which the mobile relay is providing service continuity.

2. The service continuity method according to claim 1, wherein said session association is performed using:
a backup identifier that is broadcast by said mobile relay, and that is listened for and recognized by said residential gateway or by said intermediate device; or
a backup identifier that is broadcast by said residential gateway or by said intermediate device and that is listened for and recognized by said mobile relay.

3. The service continuity method according to claim 1, wherein said mobile relay is onboard a drone or an autonomous vehicle.

4. A mobile relay, comprising:
a processor; and
a non-transitory computer-readable medium comprising instructions stored thereon, which when executed by the processor configure the mobile relay to perform acts comprising:
following detection of a fault comprising at least one service to which a residential gateway normally gives access no longer being accessible or in a quality of at least one service to which said gateway normally gives access being degraded:
receiving from a supervision center (CSC) at least one instruction for providing continuity of said service;
where necessary, upon being instructed by said supervision center (CSC), adjusting a geographical position of the mobile relay as a function of the geographical position of the residential gateway;
establishing a session association with the residential gateway or with an intermediate device between the mobile relay and the residential gateway; and
take charge of traffic relating to said service.

5. The mobile relay according to claim 4, wherein the mobile relay is further configured to broadcast a backup identifier.

6. The mobile relay according to claim 4, wherein the mobile relay is further configured to listen for and recognize a backup identifier broadcast by said residential gateway or by said intermediate device.

7. The mobile relay according to claim 4, wherein the mobile relay is onboard a drone or an autonomous vehicle.

8. A service continuity system, comprising:
at least one mobile relay, comprising:
a processor; and
a non-transitory computer-readable medium comprising instructions stored thereon, which when executed by the processor configure the mobile relay to perform acts comprising:
following detection of a fault comprising at least one service to which a residential gateway normally gives access no longer being accessible or in a quality of at least one service to which said residential gateway normally gives access being degraded:
receiving from a supervision center (CSC) at least one instruction for providing continuity of said service;
where necessary, upon being instructed by said supervision center (CSC), adjusting a geographical position of the mobile relay as a function of the geographical position of the residential gateway;
establishing a session association with the residential gateway or with an intermediate device between the mobile relay and the residential gateway; and
charge of traffic relating to said service; and
the residential gateway, which comprises:
a processor; and
a non-transitory computer-readable medium comprising instructions stored thereon, which when executed by the processor of the residential configure the residential gateway to perform acts comprising:
acting, after a fault has been detected, to establish the session association with said mobile relay or with the intermediate device between the residential gateway and said mobile relay, and to transfer thereto the traffic relating to said service.

9. A non-transitory computer-readable medium comprising computer program code instructions stored thereon for executing a service continuity method when the instructions are executed by a processor of a mobile relay, wherein the instructions configure the mobile relay to perform acts comprising:
following detection of a fault comprising at least one service to which a residential gateway normally gives access no longer being accessible or in a quality of at least one service to which said residential gateway normally gives access being degraded:
receiving from a supervision center (CSC) at least one instruction for providing continuity of said service;
where necessary, upon being instructed by said supervision center (CSC), adjusting a geographical position of the mobile relay as a function of the geographical position of the residential gateway;
establishing a session association with the residential gateway or with an intermediate device between the mobile relay and the residential gateway; and
take charge of traffic relating to said service.

10. The service continuity system according to claim 8, wherein said residential gateway is further configured to broadcast a backup identifier.

11. The service continuity system according to claim 8, wherein said residential gateway is further configured to listen for and recognize a backup identifier broadcast by said mobile relay.

12. A service continuity method comprising:
a step of detecting a fault comprising at least one service to which a residential gateway normally provides access no longer being accessible or in a quality of service of at least one service to which the residential gateway normally gives access being degraded, then performing the following steps:
a) a supervision center (CSC) selecting at least one mobile relay;
b) said supervision center (CSC) communicating at least one instruction to the selected mobile relay for the purpose of ensuring continuity of said service, wherein said supervision center (CSC) adjusts the geographical position of said mobile relay as a function of a geographical position of the residential gateway for which the mobile relay is providing service continuity;
c) said mobile relay setting up a session association with said residential gateway or with an intermediate device; and
d) traffic relating to said service being redirected to the mobile relay.

* * * * *

UNITED STATES PATENT AND TRADEMARK OFFICE
CERTIFICATE OF CORRECTION

PATENT NO.         : 10,594,595 B2                               Page 1 of 1
APPLICATION NO.    : 15/770385
DATED              : March 17, 2020
INVENTOR(S)        : Mohamed Boucadair et al.

It is certified that error appears in the above-identified patent and that said Letters Patent is hereby corrected as shown below:

In the Claims

In Claim 8, Column 16, Line 41:
Please insert --take-- before the word "charge".

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*